(12) United States Patent
Fredricks et al.

(10) Patent No.: US 10,321,626 B2
(45) Date of Patent: Jun. 18, 2019

(54) LIGHTWEIGHT STALK ROLL KNIFE

(71) Applicant: CNH Industrial America LLC, New Holland, PA (US)

(72) Inventors: Eric Fredricks, Davenport, IA (US); James Gessel, Geneseo, IL (US); Brian Crow, Rock Island, IL (US); Eric Walker, Narvon, PA (US); Michael Berggren, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 15/248,875

(22) Filed: Aug. 26, 2016

(65) Prior Publication Data

US 2018/0054962 A1    Mar. 1, 2018

(51) Int. Cl.
| | |
|---|---|
| *A01D 45/02* | (2006.01) |
| *A01D 34/44* | (2006.01) |
| *A01D 41/06* | (2006.01) |
| *A01D 57/06* | (2006.01) |
| *A01D 101/00* | (2006.01) |

(52) U.S. Cl.
CPC ............. *A01D 34/44* (2013.01); *A01D 41/06* (2013.01); *A01D 45/025* (2013.01); *A01D 57/06* (2013.01); *A01D 2101/00* (2013.01)

(58) Field of Classification Search
CPC ........ A01D 34/44; A01D 34/73; A01D 41/06; A01D 45/025; A01D 57/06; A01D 2101/00
See application file for complete search history.

(56) References Cited

U.S. PATENT DOCUMENTS

| | | | | |
|---|---|---|---|---|
| 3,982,385 A | * | 9/1976 | Hyman | A01D 45/025 460/31 |
| 4,297,831 A | * | 11/1981 | Pioch | A01D 34/826 56/295 |
| 5,467,586 A | * | 11/1995 | Lin | A01D 34/73 56/17.5 |
| 6,216,428 B1 | | 4/2001 | Becker et al. | |
| 6,470,662 B1 | * | 10/2002 | Burke | A01D 34/73 56/255 |
| 2010/0178964 A1 | | 7/2010 | Anderson | |
| 2012/0042621 A1 | * | 2/2012 | Lohrentz | A01D 45/021 56/109 |
| 2015/0319926 A1 | | 11/2015 | Madheswaran et al. | |

FOREIGN PATENT DOCUMENTS

| | | |
|---|---|---|
| EP | 0904686 A1 | 3/1999 |
| EP | 1269829 A1 | 1/2003 |
| WO | 2012052866 | 11/2012 |
| WO | 2012152866 A1 | 11/2012 |

OTHER PUBLICATIONS

European Search Report for European Application No. 17187804.4, dated Jan. 24, 2018 (6 pages).

* cited by examiner

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A header for a combine harvester is provided. The header includes a row unit, a stalk roll, and a stalk roll knife. The stalk roll is mounted to the row unit. The stalk roll knife is mounted to the stalk roll and includes a plurality voids about a trailing end of the stalk roll knife.

20 Claims, 9 Drawing Sheets

LIGHTWEIGHT STALK ROLL KNIFE

FIELD OF THE INVENTION

The present invention relates generally to a row unit of a corn header for use with combine harvesters. In particular, the present invention relates to a stalk roll knife of a row unit having a plurality of voids.

BACKGROUND OF THE INVENTION

An agricultural combine is a machine used to harvest a variety of crops from a field. During a harvesting operation, a corn header assembly at the front of the combine cuts ripened crop from the field. Row dividers direct rows of corn stalks to ear stripping plates and stalk rolls. Individual stalks of corn enter row units and are pulled downwardly and rearwardly by the stripping plates and stalk rolls. One or more knives on each stalk roll rotate continually and rapidly during harvesting operations so as to cut or "mutilate" the stalks to aid in separation of ears of corn from respective stalks. Thereafter, cut crop material transfers to an auger that advances the crop towards the vehicle centerline. A feederhouse supporting the corn header assembly transfers the crop material into the combine by way of a conveyor such as an elevator assembly. The corn header supports the weight of all of its subassemblies and components, e.g., row units and dividers. As such, the harvester must provide sufficient power to move and operate the header, the amount of power necessary being related to the overall weight of the header.

As such, there is still a need for a stalk roll assembly that has sufficient performance, strength, and efficiency during harvesting operations. The present invention addresses the foregoing issues of conventional corn header stalk rolls.

BRIEF SUMMARY OF THE INVENTION

In accordance with an exemplary embodiment of the present invention, there is provided a stalk roll knife for a row unit of a header for a combine harvester having a profile, a leading knife edge, a second longitudinal end, a plurality of apertures, and a plurality of voids. The profile is an overall planar rectangular profile. The leading knife edge extends along a first longitudinal end of the rectangular profile. The second longitudinal end is opposite the first longitudinal end. The plurality of apertures are about the second longitudinal end for receiving a respective fastener therethrough. The plurality of voids are about the second end.

In accordance with another exemplary embodiment of the present invention, there is provided a stalk roll knife for a row unit of a header for a combine harvester having a planar body including a front portion, a castellated rear portion, and a plurality of apertures. The front portion has a leading knife edge extending along a longitudinal end of the planar body. The castellated rear portion extends from the front portion. The plurality of apertures are for receiving a respective fastener therethrough.

In accordance with yet another exemplary embodiment of the present invention, there is provided a stalk roll knife for a row unit of a header for a combine harvester having a planar body, a leading knife edge, a second longitudinal end, a plurality of apertures, and a first elongated window. The leading knife edge extends along a first longitudinal end of the planar body. The second longitudinal end of the planar body is opposite the first longitudinal end. The plurality of apertures is about the second longitudinal end and is for receiving a respective fastener therethrough. The first elongated window is between a first aperture and a second aperture of the plurality of apertures.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

In the drawings.

DETAILED DESCRIPTION OF THE INVENTION

Figure 1:
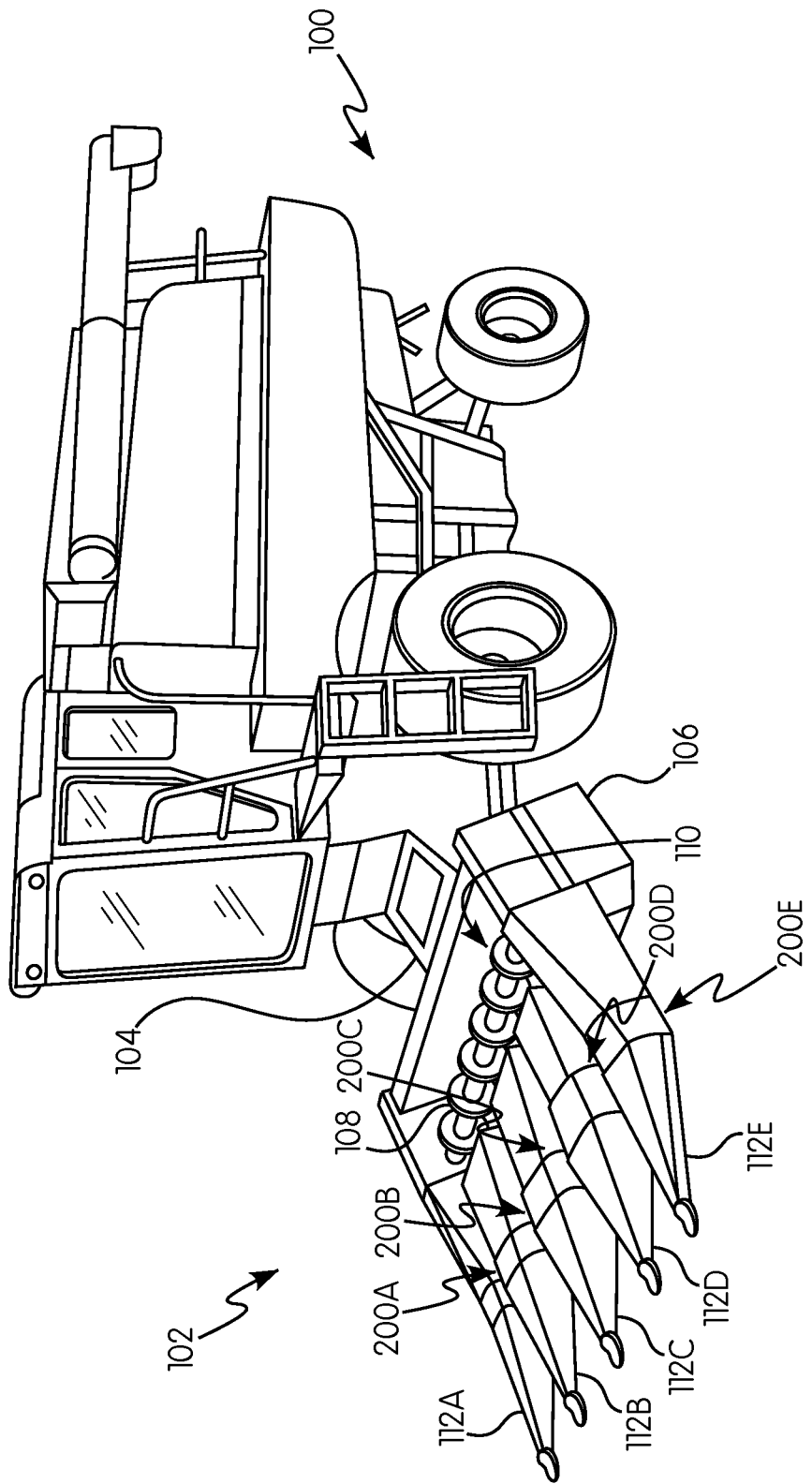
FIG. 1 is a perspective view of an agricultural harvester including a corn header in accordance with an exemplary embodiment of the present invention.

Reference will now be made in detail to the various aspects of the present invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the present invention in any manner not explicitly set forth.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the identified element and designated parts thereof. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

The terms "corn," "ear," "stalk," "leaf," and "crop material" are used throughout the specification for convenience and it should be understood that these terms are not intended to be limiting. Thus, "corn" refers to that part of a crop which is harvested and separated from discardable portions of the crop material. The header of the present invention is applicable to a variety of crops, including but not limited to wheat, soybeans and small grains. The terms "debris," "material other than grain," and the like are used interchangeably.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

Referring now to the drawings wherein an exemplary embodiment of the present invention is shown, FIG. 1 illustrates corn header assembly 102 as applied to an agricultural harvester 100. The corn header assembly 102 is shown to be operatively connected to the agricultural harvester 100 for harvesting corn and feeding the corn to a feeder house 104 for receiving crop material and propelling the crop material rearwardly for further downstream processing within the combine. Such feeder houses and harvesting operations are known in the art and a further detailed description of their structure, function and operation is not necessary for a complete understanding of this particular exemplary embodiment.

The corn header assembly 102 includes header frame 106 for mounting to a forward end of the agricultural harvester 100, a conveyor 108 (such as an auger) extending lengthwise across the header frame 106 for conveying crop material to a combine feeding location or feeder house 104 through channel 110 and a plurality of row units 200A-E extending forwardly from the header frame 106. The corn header assembly 102 further includes a plurality of row dividers 112A-E extending forward from the header frame 106.

Figure 2:
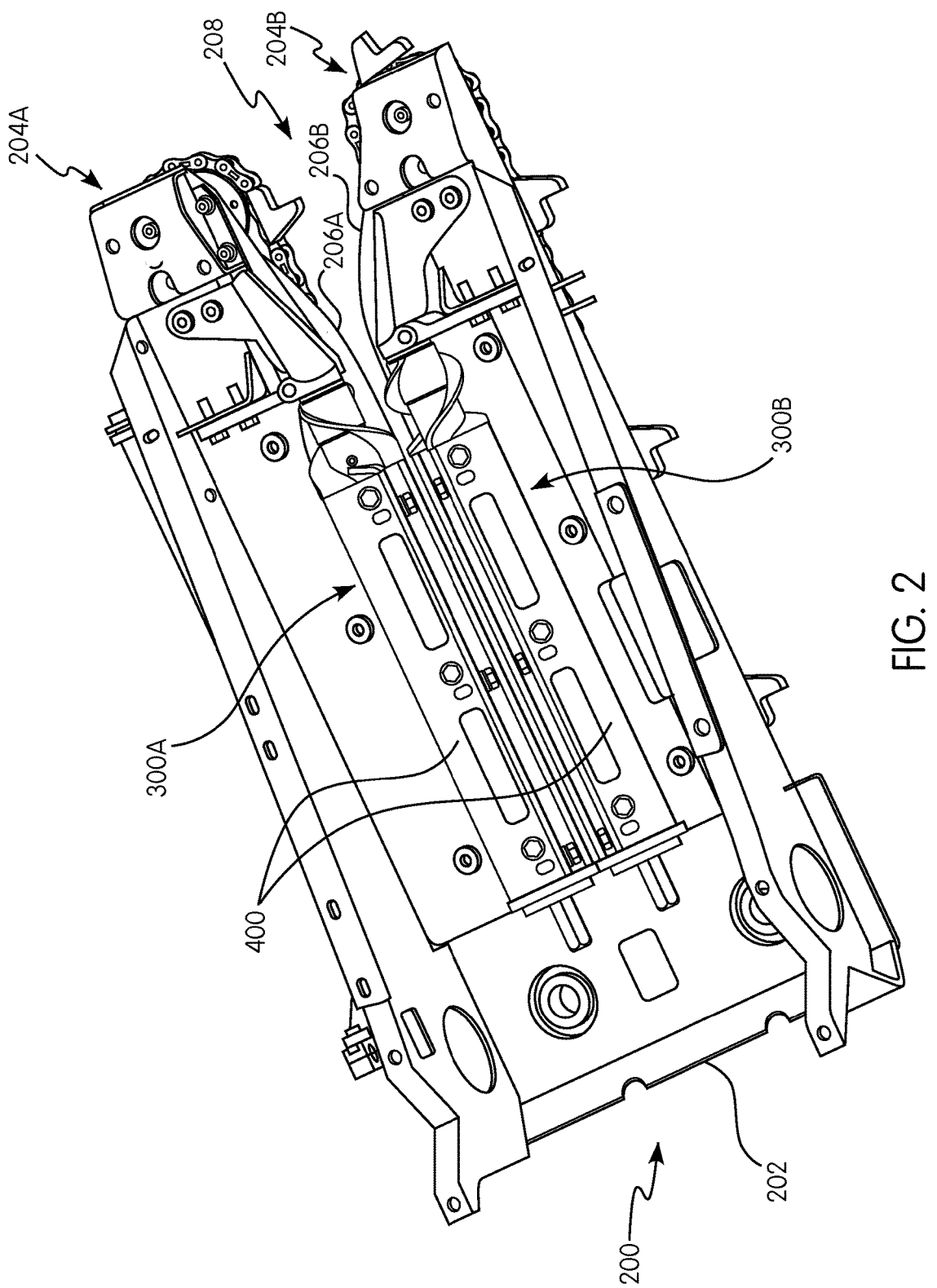
FIG. 2 is a bottom perspective view of a row unit of the corn header of FIG. 1 in accordance with an exemplary embodiment of the present invention.

Referring now to FIG. 2, there is illustrated row unit 200A in accordance with an exemplary embodiment of the present invention. Row unit 200A is similarly constructed as row units 200B-E. FIG. 2 is a bottom perspective view of various components of row unit 200A. The row unit 200A includes a frame 202 forming two row unit arms 204A, 204B and two stripping plates 206A, 206B which define a gap 208 therebetween. Stalk rolls 300A, 300B are shown positioned adjacent to stripping plates 206A, 206B. As illustrated in FIG. 2, the front edges of the stalk rolls 300A, 300B are aligned about a plane perpendicular to a longitudinal axis of the stalk rolls. In other words, the front edges are aligned so as to be at the same position along a length of the stripping plate.

Figure 3A:
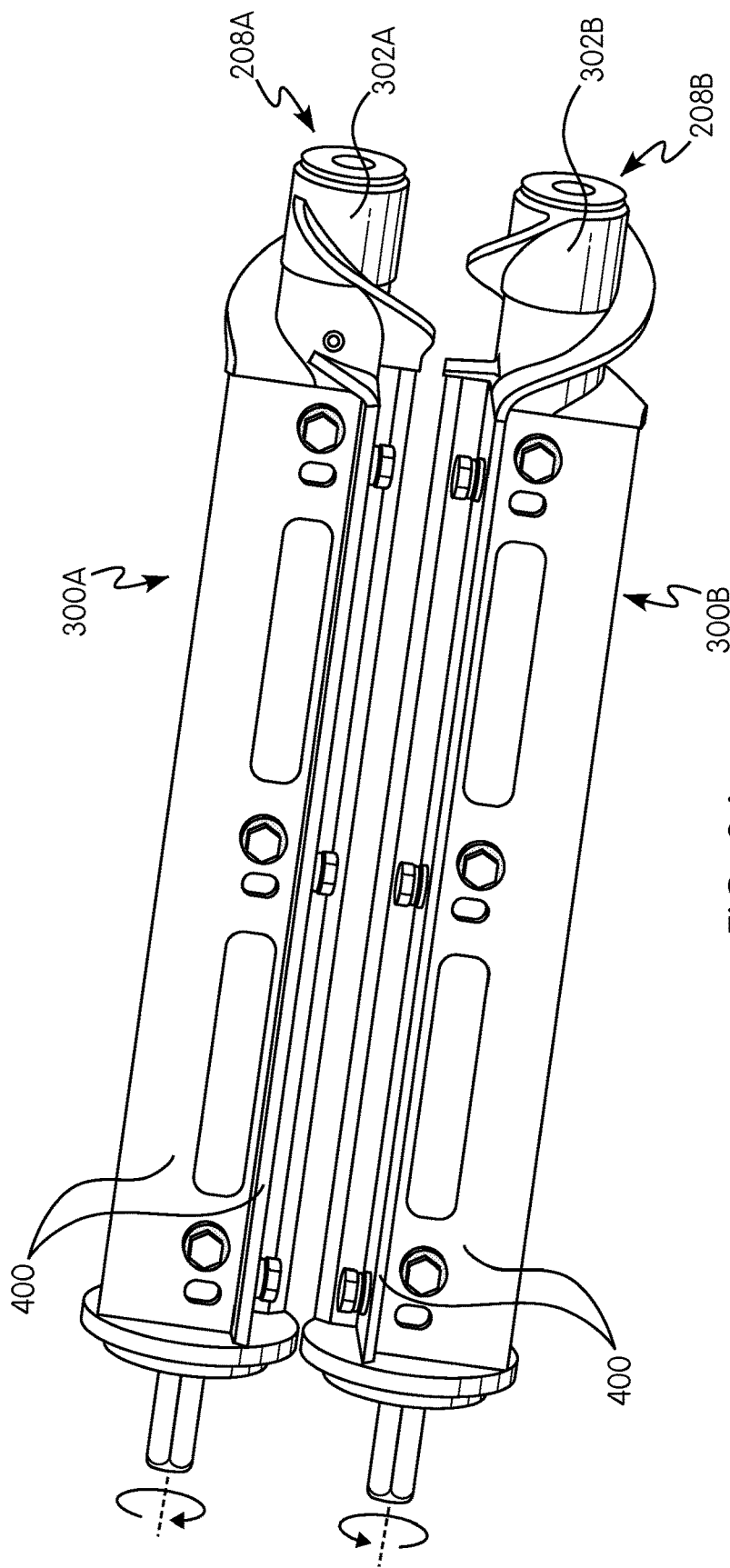
FIG. 3A is a bottom perspective view of a pair of stalk rolls of the row unit of FIG. 2 in accordance with an exemplary embodiment of the present invention.

Referring now to FIG. 3A, there is illustrated an exemplary embodiment of the stalk roll assemblies 300A and 300B, in accordance with an exemplary embodiment of the present invention. The stalk roll assemblies 300A, 300B each include helical impellers 302A, 302B at a front end thereof. Each stalk roll assembly 300A, 300B rotates in an opposite direction from the other, in a direction that acts to pull corn stalks downwardly through the gap 208 as stalk roll knives 400 engage the stalk.

Figure 3B:
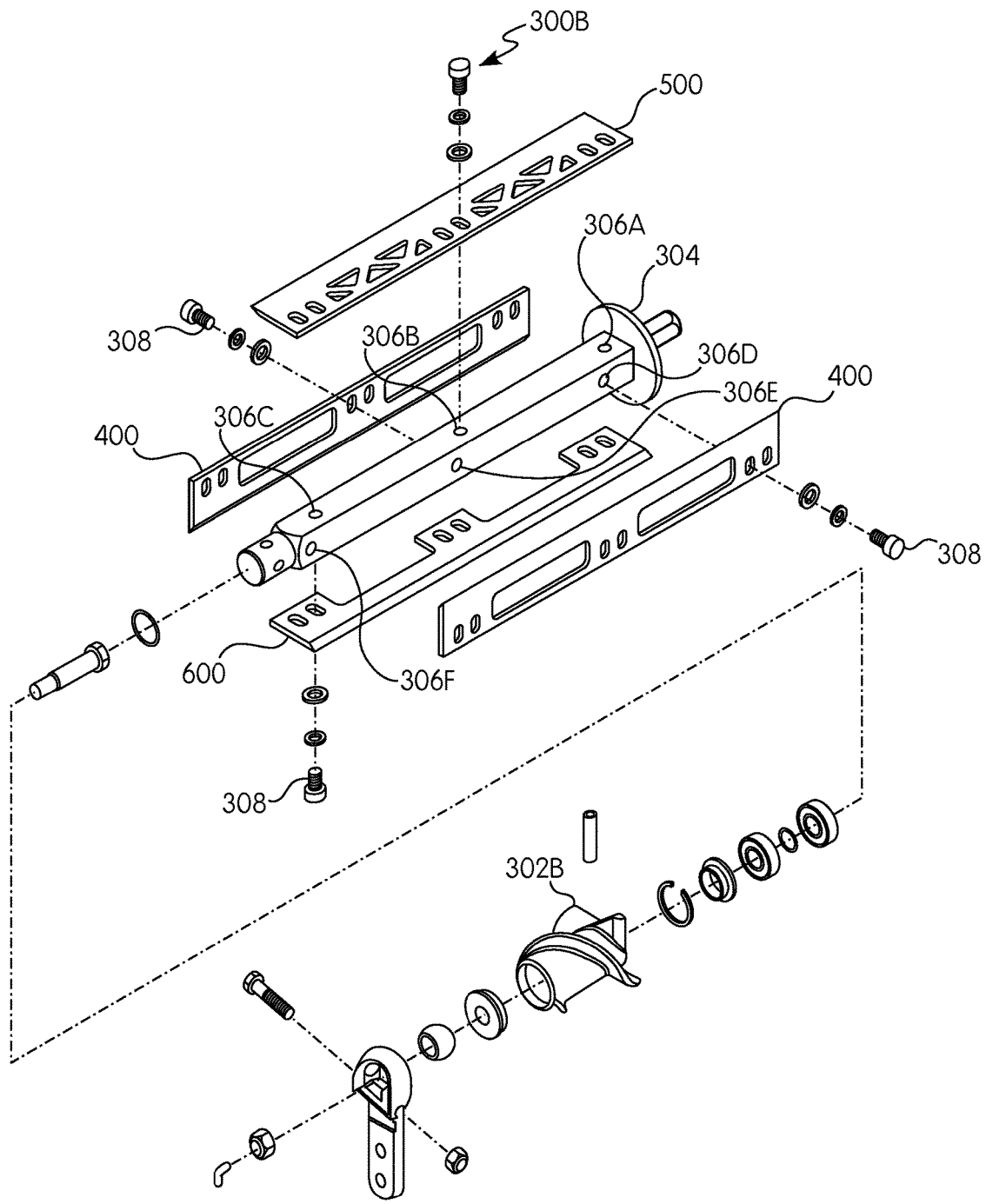
FIG. 3B is an exploded side perspective view of one of the stalk rolls of FIG. 3A in accordance with an exemplary embodiment of the present invention.

FIG. 3B illustrates an exploded view of stalk roll assembly 300B, in accordance with an exemplary embodiment of the present invention. Shaft 304 is a hollow tube that receives one or more stalk roll knives 400, 500 or 600. Shaft 304 is illustrated as a square prism, but may alternatively be a cylinder, triangular prism, or other polygonal prism. The shaft includes a plurality of boreholes, e.g. 306A-F, preferably three on each side of the shaft as shown in FIG. 3B. Fasteners 308 are provided for mounting each stalk roll knife 400 to the shaft 304. It should be noted that stalk roll knives 400, 500 and 600 are all similarly mounted to the shaft 304.

Boreholes 306 may be laterally aligned on a given side of the shaft 304. Boreholes on different sides of shaft 304 may be longitudinally spaced apart or staggered, such as 306A-C compared to 306D-F in FIG. 3B. The staggered arrangement may be selected so as to avoid interference contact between fasteners 308 extending through the shaft 304.

In operation, the stalk rolls 300A, 300B each rotate in opposite directions. As a result of the gap 208 (FIGS. 2 and 3), corn stalks enter the row unit 200A. As a corn stalk enters gap 208 between the two stalk rolls 300A, 300B, the primary helical impellers 302A, 302B of the stalk rolls engage the corn stalk, exert a force that pulls the corn stalk downward, and urge the corn stalk further into the gap 208. Thus, the force exerted by the impellers pulls the corn down and away from the two stripping plates while also urging the corn stalk rearward (i.e., leftward in FIGS. 2 and 3) towards the stalk roll knives 400.

Figure 4:
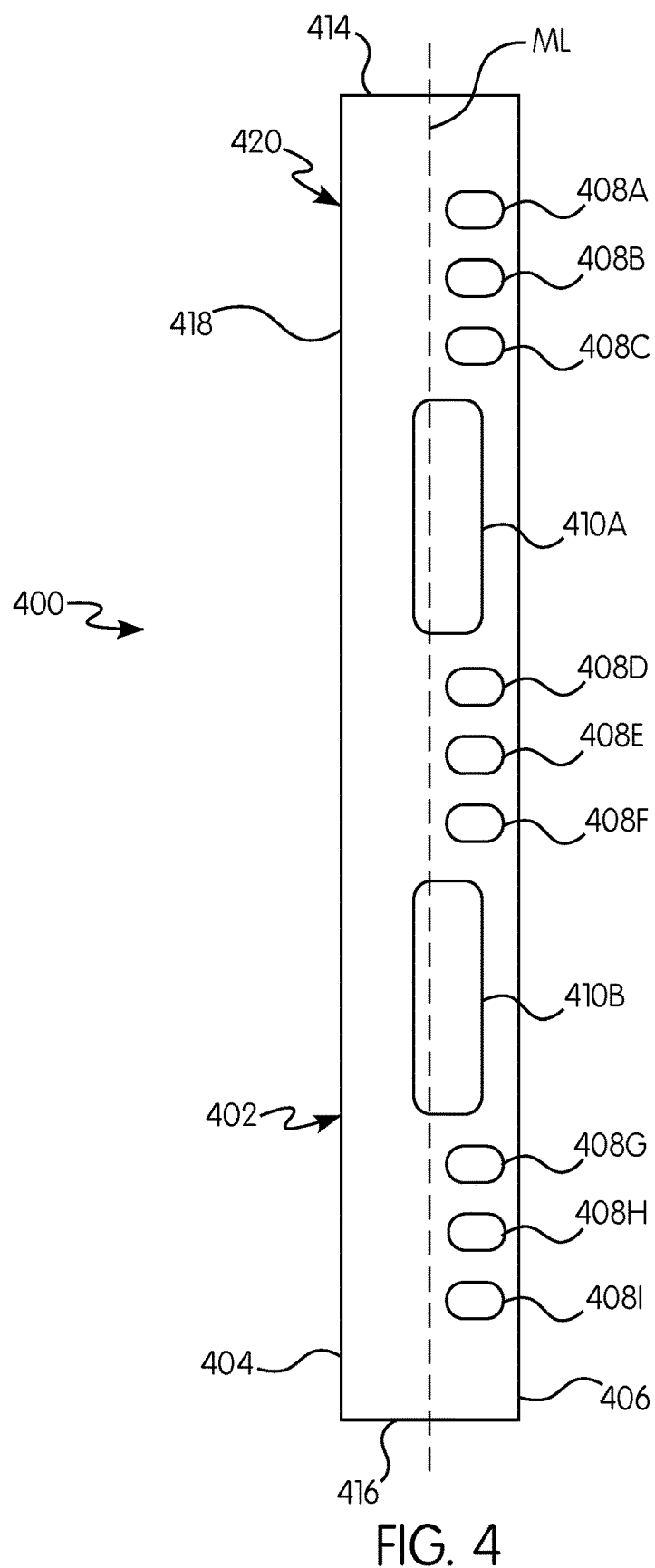
FIG. 4 is a top plan view of a stalk roll knife of the stalk rolls of FIG. 3A in accordance with a first exemplary embodiment of the present invention.

Referring now to FIG. 4, there is illustrated an exemplary embodiment of a stalk roll knife 400 applicable to the present invention. The stalk roll knife 400 has an overall generally rectangular profile 402 and includes a first longitudinal end or front portion 404 opposite a second longitudinal end or rear portion 406, with a leading knife edge extending along the first longitudinal end 404. The leading knife edge includes a cutting surface for mutilating corn stalks.

As best shown in FIG. 3B, the stalk roll knife 400 is generally planar, and may be formed as substantially planar. In other words, stalk roll knife 400 defines a planar body having a front portion, i.e., the first longitudinal end 404, and a rear portion, i.e, the second longitudinal end 406. Extending between the longitudinal ends 404, 406 are lateral sides 414 and 416.

Referring back to FIG. 4, the stalk roll knife 400 further includes a plurality of apertures 408A-I for mounting to shaft 304 via bolts 308. The plurality of apertures 408A-I includes subsets of multiple apertures such as three apertures 408A-C so as to account for the staggered arrangement of boreholes 306 on the shaft 304, as discussed above and shown in FIG. 3B. The apertures 408A-I are located adjacent the second longitudinal end 406, i.e., they are spaced from the first longitudinal end 404, and preferably spaced from a midline ML of the stalk roll knife 400.

Subsets of the apertures 408A-C and 408G-I are located near lateral ends 414 and 416, respectively. Another subset of apertures 408D-F is located about a midpoint between the lateral ends 414, 416. Individual apertures of a subset are generally evenly spaced, e.g., aperture 408B is equidistant from both 408A and 408C. Each subset of the plurality of apertures, e.g., 408A-C, extends across about ⅕ of the overall width of the stalk roll knife 400, i.e., the distance between lateral ends 414 and 416.

Figure 4A:
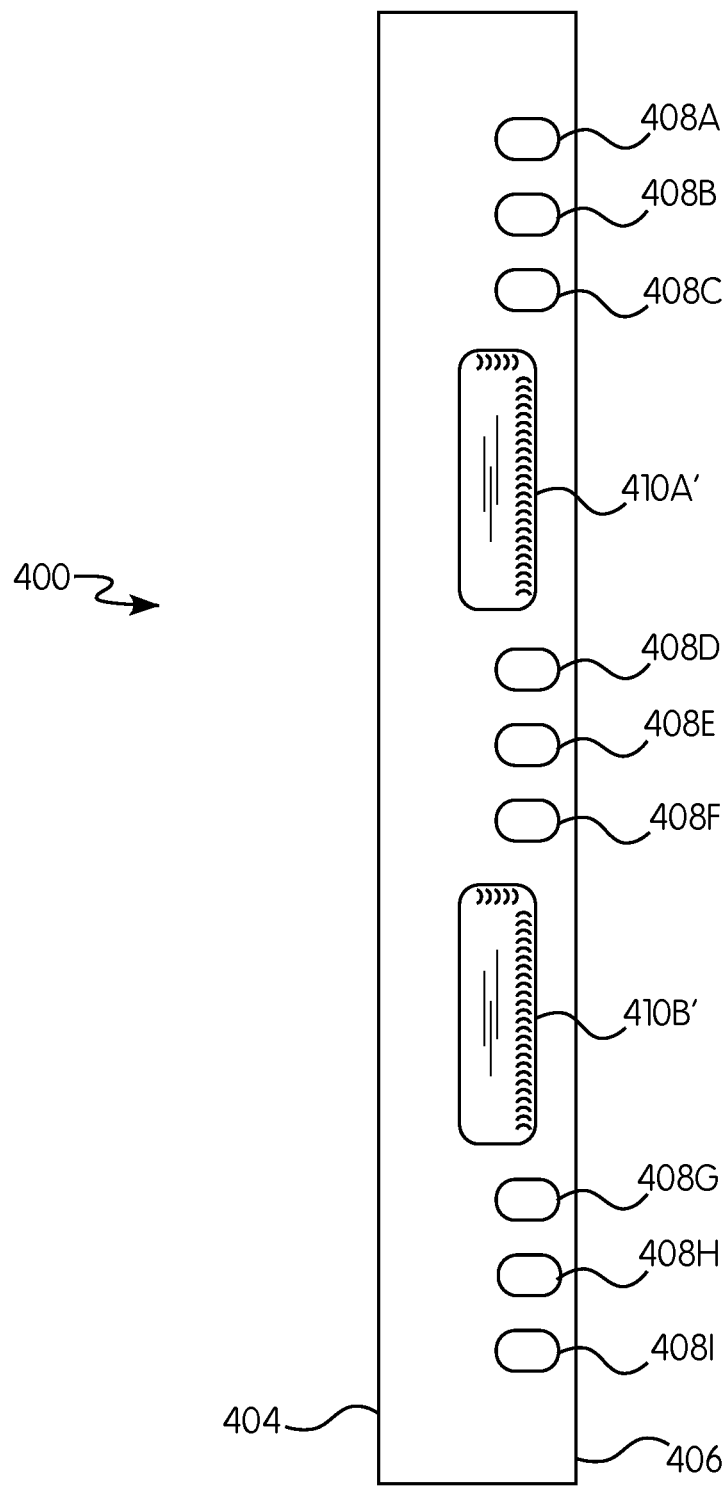
FIG. 4A is a top plan view of a stalk roll knife of the stalk rolls of FIG. 3A in accordance with another exemplary embodiment of the present invention.

The stalk roll knife 400 also includes a plurality of voids 410A and 410B also referred to as windows. The voids extend completely through the stalk roll knife, although in alternative exemplary embodiments some or all of the voids may be formed as depressions or thinned areas 410A', 410B' (FIG. 4A) within the knife.

The overall shape of voids 410A-B may be generally or substantially rectangular as shown in FIG. 4. Other shapes are contemplated, including square, circle, triangle or hexagon. Alternatively, elongated shapes such as oval or trapezoid may be used. While FIG. 4 shows only two voids, one or more than two voids may be configured on the stalk roll knife 400.

Regarding the size of the voids as shown in FIG. 4, the voids 410A-B may each be larger, smaller, or equal in area to each of the plurality of apertures 408A-I. In an exemplary embodiment, the sum of an area of the plurality of voids 410A-B is larger than a sum of an area of the plurality of apertures 408A-I or the sum of a subset of the plurality of apertures, e.g., 408A-C. In accordance with another exemplary embodiment, the area defined by the plurality of voids may be between 5% and 50% of the overall surface area of the profile 402, preferably at least 10% or at least 20% of the overall surface area of the profile, and more preferably between about 10% and about 20% of the overall surface area of the profile.

Each of the voids 410A-B extends across about ⅕ of an overall width of the stalk roll knife 400, i.e., the distance between lateral ends 414 and 416.

Regarding the position of the voids 410A-B as shown in FIG. 4, the voids are generally positioned adjacent the second longitudinal end 406, but may extend toward leading knife edge 404 including beyond a lateral midline ML defined halfway between the leading knife edge and second longitudinal end. The voids may be positioned between each set of apertures of the plurality of apertures, such as void 410A positioned between apertures 408A-C and apertures 408D-F. Likewise, void 410B may be positioned between apertures 408D-F and apertures 408G-I.

Figure 5:
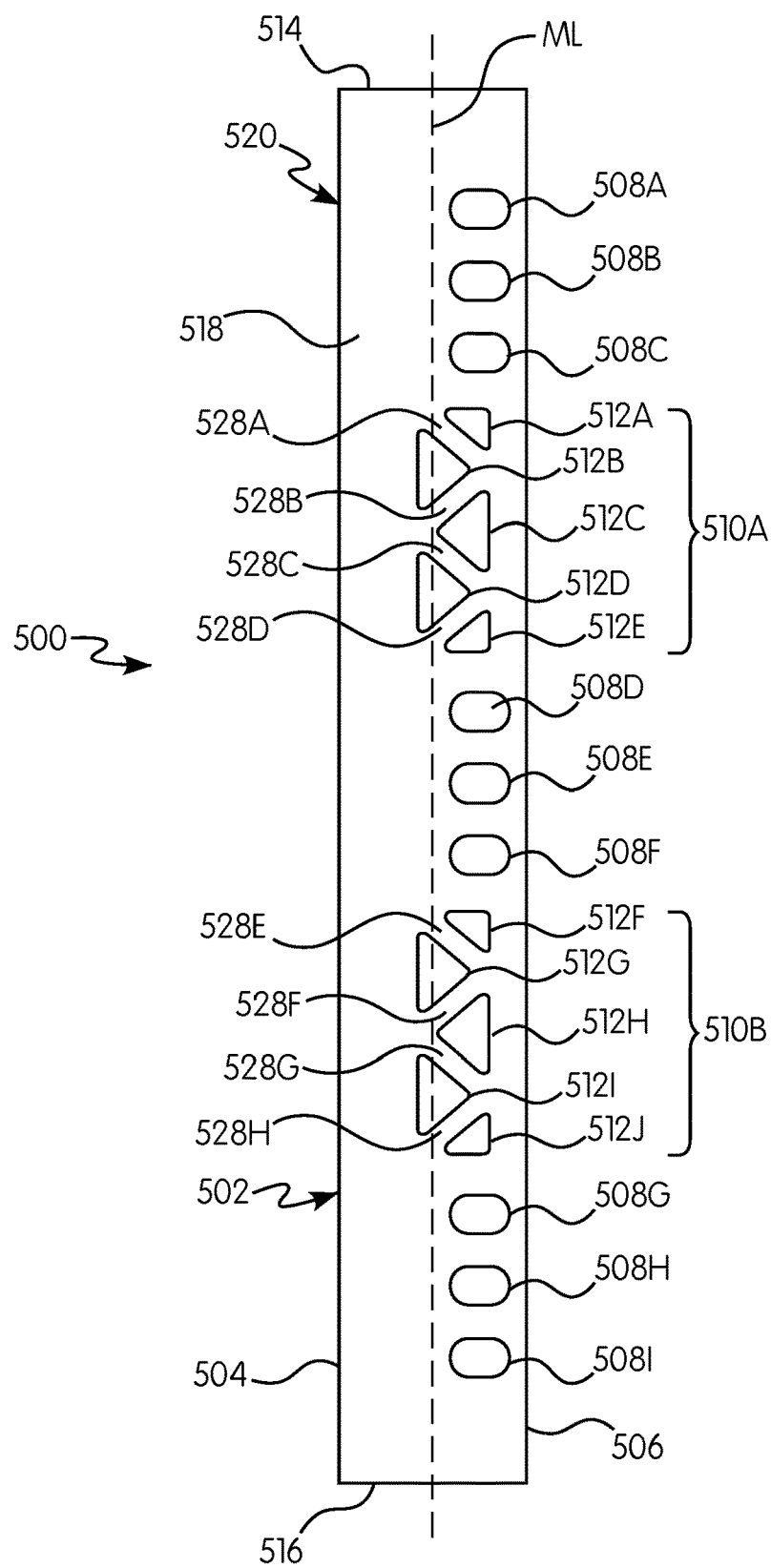
FIG. 5 is top plan view of a stalk roll knife of the stalk rolls of FIG. 3A in accordance with a second exemplary embodiment of the present invention.

Referring to FIG. 5, there is illustrated a stalk roll knife 500 in accordance with an exemplary embodiment of the present invention. It should be noted that profile 502, first longitudinal end 504, second longitudinal end 506, apertures 508A-I, lateral edges 514 and 516, top surface 518, and bottom surface 520 are arranged as discussed above for the equivalent parts of stalk roll knife 400.

Stalk roll knife 500 includes a plurality of voids 510A-B. The voids 510A, 510B are similarly configured as voids 410A, 410B but the stalk roll knife 500 includes a plurality of trusses 528A-H forming subsets of individual triangular voids 512A-E and 512F-J. The trusses 528A-H serve to strengthen each void region 510A-B and distribute loads throughout the stalk roll knife 500. In other words, the voids 510A-B may be windows divided into a subset of individual voids 512A-J resulting in trusses 528A-H positioned therebetween. The triangular voids 512A-J are preferably isosceles right triangles, although other types of triangles may be used.

The overall perimeter of the voids 510A-B may be generally or substantially rectangular as shown in FIG. 5. Individual voids may be generally or substantially triangular as shown by the subset of voids 512A-J. Other shapes formed by the trusses are contemplated, including square, circle, oval, hexagon, and the like. For example, trusses may be configured to form a plurality of individual hexagons to provide a honeycomb type of structure, which is desirable for distributing loads about the stalk roll knife 500.

Similar to the size of voids 410A-B described above, the area of voids 510A-B (or the area of individual voids 512A-J) may each be larger, smaller, or equal in area to each of the plurality of apertures 508A-I. In accordance with an exemplary embodiment, the sum of an area of the plurality of individual voids 512A-J is larger than a sum of an area of the plurality of apertures 508A-I or alternatively larger than the sum of a subset of the plurality of apertures, e.g., 508A-C. In accordance with an exemplary embodiment, the area defined by the plurality of voids may be between 5% and 50% of the overall surface area of the profile 502, preferably at least 10% or 20% of the overall surface area of the profile, and more preferably between about 10% and about 20% of the overall surface area of the profile.

As with voids 410A-B described above, each of the voids 510A-B extends across about ⅕ of an overall width of the stalk roll knife 500, i.e., the distance between lateral ends 514 and 516. Likewise, each set of the plurality of apertures, e.g., 508A-C, extends across about ⅕ of the overall width.

The voids 510A-B are generally positioned about the second longitudinal end 506, but may extend toward leading knife edge 504 including beyond a lateral midline ML defined halfway between the leading knife edge and second longitudinal end 506, as shown in FIG. 5. The voids may be positioned between apertures of the plurality of apertures, such as void region 510A positioned between apertures 508A-C and apertures 508D-F. Likewise, void region 510B may be positioned between apertures 508D-F and apertures 508G-I.

Figure 6:
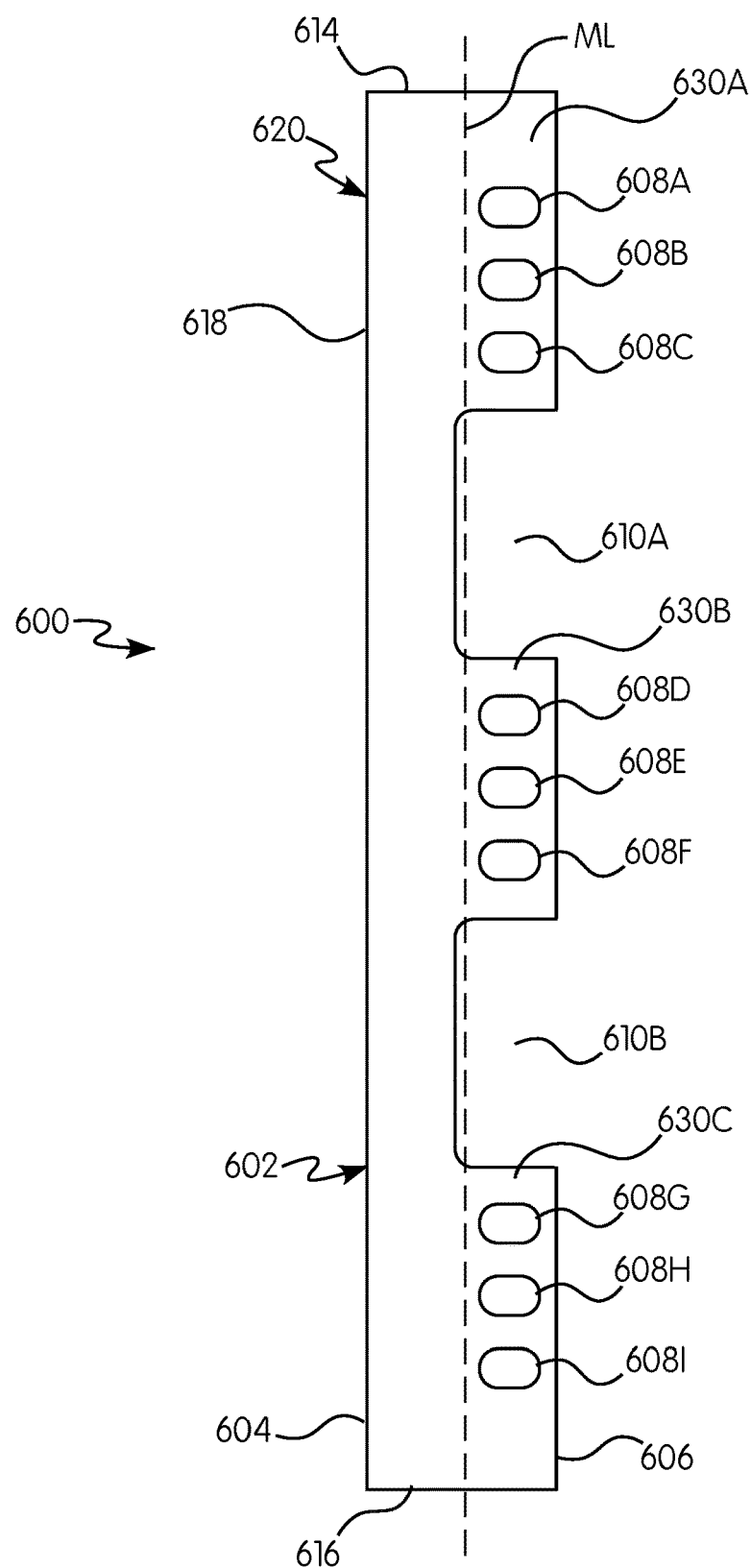
FIG. 6 is a top plan view of a stalk roll knife of the stalk rolls of FIG. 3A in accordance with a third exemplary embodiment of the present invention.

Referring to FIG. 6, there is illustrated a stalk roll knife 600 in accordance with another exemplary embodiment of the present invention. It should be noted that profile 602, first longitudinal end 604, apertures 608A-I, lateral edges 614 and 616, top surface 618, and bottom surface 620 are arranged as discussed above for the equivalent parts of stalk roll knife 400.

Voids 610A, 610B in FIG. 6 are formed as cutouts from the second longitudinal end 606 of the stalk roll knife 600 such that the second longitudinal end 606 forms a castellated rear portion. In other words, voids 610A-B are similar to voids 410A-B in FIG. 4 but are expanded to extend through the second longitudinal end 606. This arrangement maximizes free space adjacent the second longitudinal end 606 of the stalk roll knife 600, which is opposite the front first longitudinal end 604. Additionally, the castellated shape provides few discontinuities in the structure of the stalk roll knife 600. Finally, this shape may be easier to manufacture or cut from raw material than interior voids.

The voids 610A and 610B are the crenels of the castellated shape. The plurality of apertures 608A-I are located on the castellated rear portion, preferably within the battlements or merlons 630A-C.

Figure 6A:
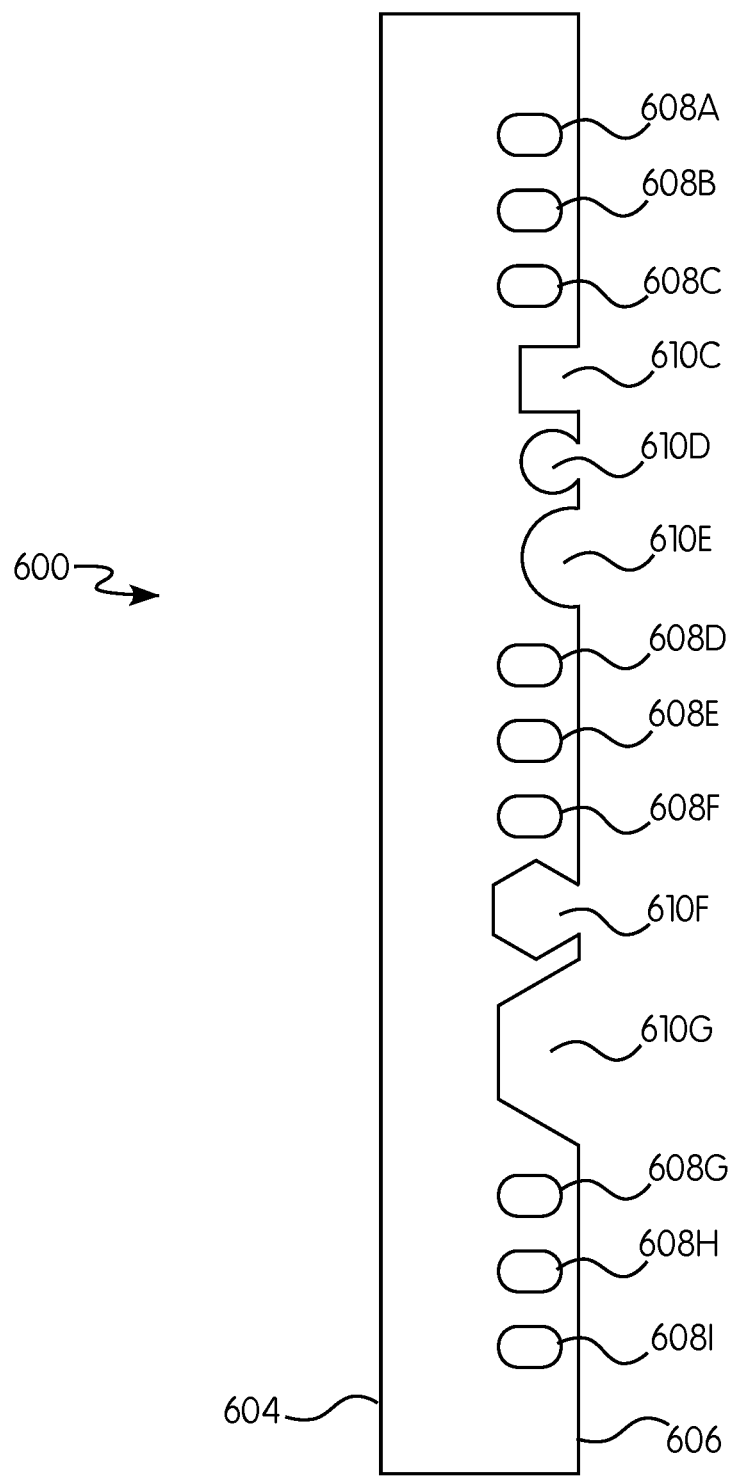
FIG. 6A is a top plan view of a stalk roll knife of the stalk rolls of FIG. 3A in accordance with yet another exemplary embodiment of the present invention.

The shape of voids 610A-B may be generally or substantially rectangular as shown in FIG. 6. However, in accordance with another exemplary embodiment of the invention, other shapes are contemplated, including square, circle, semicircle, hexagon, and trapezoid, as shown in FIG. 6A.

Similar to the size of voids 410A-B described above, the voids 610A-B may each be larger, smaller, or equal in area to each of the plurality of apertures 608A-I. In accordance with an exemplary embodiment, the sum of an area of the plurality of voids 610A-B is larger than a sum of an area of the plurality of apertures 608A-I or the sum of a subset of the plurality of apertures, e.g., 608A-C. In accordance with an exemplary embodiment, the area defined by the plurality of voids may be between 5% and 50% of the overall surface area of the profile 602, preferably at least 10% or 20% of the overall surface area of the profile, and more preferably between about 10% and about 20% of the overall surface area of the profile.

As with voids 410A-B described above, each of the voids 610A-B extends across about ⅕ of an overall width of the stalk roll knife 600, i.e., the distance between lateral ends 614 and 616. Likewise, each subset of the plurality of apertures, e.g., 608A-C, extends across about ⅕ of the overall width. Similarly, the battlements 630A-C each have a width of about ⅕ of the overall width.

The voids 610A-B are generally positioned about the second longitudinal end 606, but may extend toward leading knife edge 604 including beyond a lateral midline ML defined halfway between the leading knife edge and second longitudinal end. The voids may be positioned between apertures of the plurality of apertures, such as void 610A positioned between apertures 608A-C and apertures 608D-F. Likewise, a void 610B may be positioned between apertures 608D-F and apertures 608G-I.

In general, the voids 410A-B, voids 510A-B, or voids 610A-B provide structural characteristics advantageous for use with stalk rolls as well as reducing the weight of the overall stalk roll knife 400/500/600. Weight reduction in the header 102 of a combine harvester 100 has several subsequent benefits, such as improved gas mileage and reduced material cost. Likewise, a lightweight stalk roll assembly 300A, 300B puts less stress on its support structure and requires less power to rotate.

Traits of the voids (including voids 410A-B, voids 510A-B and individual voids 512A-J, and voids 610A-B), such as their location, arrangement, number, size, shape, and the like, are chosen so as to maximize weight reduction for the overall stalk roll knife 400/500/600 and minimize stresses and strains on the part.

While the present invention has been described with reference to exemplary embodiments, it will be appreciated by those skilled in the art that various changes may be made and equivalents may be substituted for elements thereof without departing from the scope of the present invention. In addition, modifications may be made to adapt a particular situation or material to the teachings of the present invention without departing from the essential scope thereof. For example, if a stalk roll knife were to be provided with only two apertures, e.g. 408A and 408I in FIG. 4, or only two subsets of apertures, e.g., 408A-C and 408G-I, then a greater surface area may be used for the voids or voids. It is to be understood, therefore, that the present invention not be limited to the particular aspects disclosed, but it is intended to cover modifications within the spirit and scope of the present invention as defined by the appended claims.

We claim:

1. A stalk roll assembly for a row unit of an agricultural harvester comprising: a stalk roll; and a stalk roll knife mounted to the stalk roll, the stalk roll knife comprising:
   an overall planar rectangular profile;
   a leading knife edge extending along a first longitudinal end of the rectangular profile;
   a second longitudinal end of the rectangular profile opposite the first longitudinal end;
   a plurality of apertures about the second longitudinal end for receiving a respective fastener therethrough;
   a plurality of voids about the second end; and
   a plurality of trusses each defined by a pair of voids of the plurality of voids.

2. The stalk roll assembly claim 1, wherein each of the plurality of voids is larger than each of the plurality of apertures.

3. The stalk roll assembly claim 1, wherein a sum of an area of the plurality of voids is larger than a sum of an area of the plurality of apertures.

4. The stalk roll assembly claim 1, wherein a sum of an area of the plurality of voids is at least 10 percent of an overall area of the planar rectangular profile.

5. The stalk roll assembly claim 1, wherein a sum of an area of the plurality of voids is less than 20 percent of an overall area of the planar rectangular profile.

6. The stalk roll assembly claim 1, wherein the plurality of apertures comprises a first aperture, a second aperture, and a third aperture, and wherein the plurality of voids comprises at least a first and second void between the first and second apertures and at least a third and fourth void between the second and third apertures.

7. The stalk roll assembly claim 1, wherein each of the plurality of apertures and plurality of voids are spaced from the first longitudinal end.

8. The stalk roll assembly claim 1, wherein each of the plurality of voids are triangular shaped.

9. The stalk roll assembly claim 1, wherein each of the plurality of trusses are defined by a pair of adjacent voids.

10. The stalk roll assembly claim 8, wherein the first and second voids are triangular in shape and the second void adjacent the first void has a side substantially parallel to a side of the first void.

11. The stalk roll assembly claim 1, wherein the plurality of voids comprises three adjacent triangular voids nested with at least one side of a respective triangular void substantially parallel to another side of an adjacent triangular void.

12. A row unit comprising:
   a stalk roll assembly having a stalk roll knife comprising:
   an overall planar rectangular profile,
   a leading knife edge extending along a first longitudinal end of the rectangular profile,
   a second longitudinal end of the rectangular profile opposite the first longitudinal end,
   a plurality of apertures about the second longitudinal end for receiving a respective fastener therethrough,
   a plurality of voids about the second end, and
   a plurality of trusses each defined by a pair of voids of the plurality of voids; and
   a stripping plate adjacent the stalk roll assembly.

13. The row unit of claim 12, wherein each of the plurality of voids is larger than each of the plurality of apertures, or wherein each of the plurality of voids are triangular shaped.

14. The row unit of claim 12, wherein a sum of an area of the plurality of voids is larger than a sum of an area of the plurality of apertures.

15. The row unit of claim 12, wherein a sum of an area of the plurality of voids is at least 10 percent of an overall area of the planar rectangular profile, or less than 20 percent of an overall area of the planar rectangular profile.

16. The row unit of claim 12, wherein the plurality of apertures comprises a first aperture, a second aperture, and a third aperture, and wherein the plurality of voids comprises at least a first and second void between the first and second apertures and at least a third and fourth void between the second and third apertures.

17. The row unit of claim 16, wherein the first and second voids are triangular in shape and the second void adjacent the first void has a side substantially parallel to a side of the first void.

18. The row unit of claim 12, wherein each of the plurality of apertures and plurality of voids are spaced from the first longitudinal end.

19. The row unit of claim 12, wherein each of the plurality of trusses are defined by a pair of adjacent voids.

20. The row unit of claim 12, wherein the plurality of voids comprises three adjacent triangular voids nested with at least one side of a respective triangular void substantially parallel to another side of an adjacent triangular void.

\* \* \* \* \*